United States Patent [19]
Duffy et al.

[11] Patent Number: 4,477,228
[45] Date of Patent: Oct. 16, 1984

[54] INJECTION MOLDED PROPELLER

[75] Inventors: Brian J. Duffy, Derby; Eugene J. Gratz, Wichita; Steven E. Potter, Conway Springs; Royal A. Power, Wichita, all of Kans.

[73] Assignee: The Boeing Company, Seattle, Wash.

[21] Appl. No.: 343,556

[22] Filed: Jan. 28, 1982

[51] Int. Cl.³ .............................................. B63H 1/20
[52] U.S. Cl. ............................. 416/241 A; 416/244 R; 416/244 B; 403/359
[58] Field of Search ........... 416/241 A, 241 B, 244 R, 416/244 B; 403/359

[56] References Cited

U.S. PATENT DOCUMENTS

| | | | |
|---|---|---|---|
| 99,508 | 2/1870 | Williams | 403/359 |
| 281,618 | 7/1883 | Crowell | 403/359 |
| 390,615 | 10/1888 | Nye | 403/359 |
| 3,619,882 | 11/1971 | Sobanski | 403/359 |

FOREIGN PATENT DOCUMENTS 2456236  1/1981  France .................... 416/241

Primary Examiner—Stephen Marcus
Assistant Examiner—John Kwon
Attorney, Agent, or Firm—Edwin H. Crabtree

[57] ABSTRACT

An inexpensive injection molded propeller for mounting on a drive shaft. The drive shaft is attached to the hub of the propeller by a chemical and thermal shrink fit and by deformation due to the rotational forces of the propeller thereby producing a positive locking hub on the drive shaft. The propeller may be used, not only for remote piloted missiles and aircraft, but can also be used with different types of boat inboard and outboard drives, vehicles and equipment requiring a propeller having a positive locking system for securing the propeller or the like to the drive shaft.

4 Claims, 5 Drawing Figures

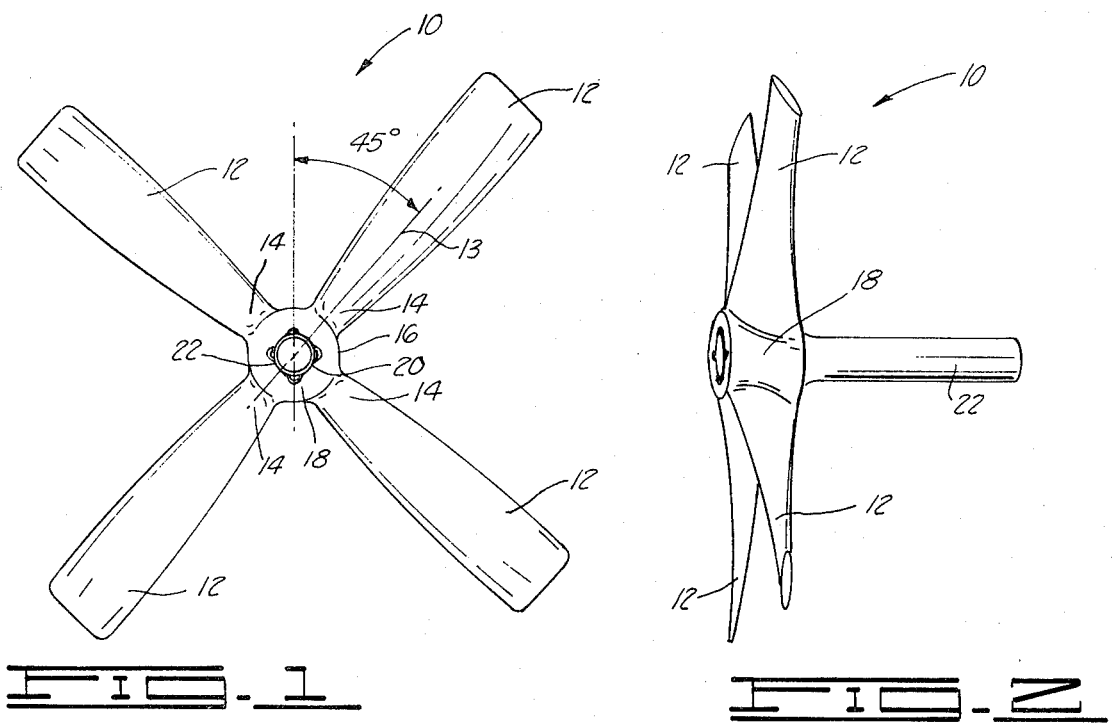
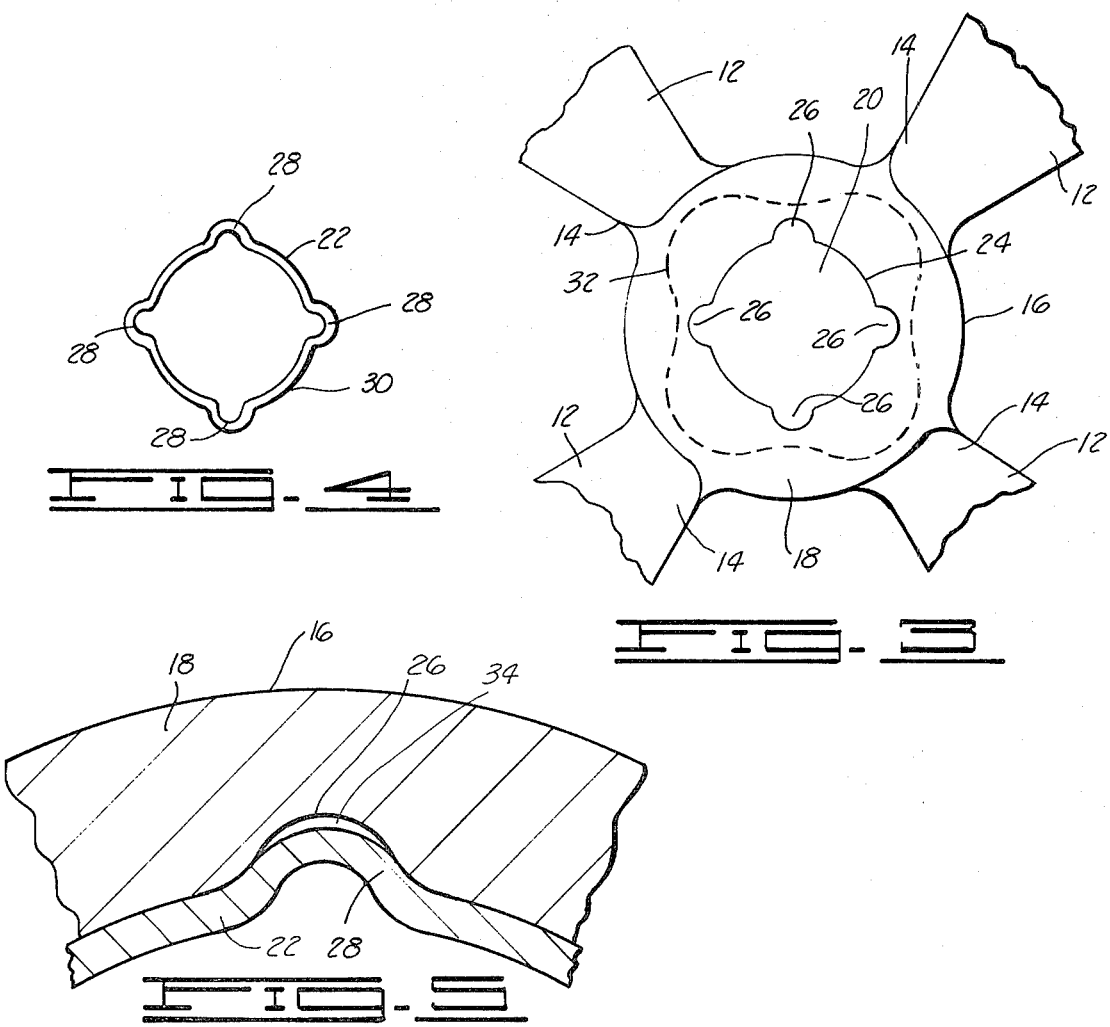

INJECTION MOLDED PROPELLER

BACKGROUND OF THE INVENTION

Heretofore, there have been different types and methods used for fabricating propellers. These methods include pattern machining using numerical control equipment and forging or a combination of these techniques. The methods requiring post machining for finishing and polishing the propeller greatly add to fabrication expense. In order to keep expenses at a minimum some economies are necessary. For example, the twist angle of the hub to the tip of the blade is not consistent in current propellers because of stress relief occuring during the machining process. This occurs primarily in metal propellers but also occurs to a more limited extent to composite wooden propellers. In addition, limitations of current machining requires non-optimal transition from the hub of the propeller to the blade. This comprises smooth air flow which reduces propeller efficiency. Propellers in current use are fabricated using compromises between what is required from an aerodynamic point of view and what can be fabricated from a practical cost point of view. In designing a producible propeller, by necessity, fabrication costs as related to functional value is a primary consideration.

The use if injection molding techniques permits, for the first time, primary consideration to be given to the aerodynamic requirements of the design of the propeller with no requirement to conform to conventional fabrication technique limitations. The injection molding manufacturing approach with materials which have not previously been used for propellers has produced a highly efficient propeller at a low cost. A comparable two-bladed wooden propeller costs normally over $100.00. A four-bladed metal propeller cost approximately $800.00. While the cost of injection molding four-bladed propellers with shaft extension can be manufactured at a cost below $50.00.

U.S. Pat. No. 3,670,382 to Keehan, U.S. Pat. No. 3,423,700 to Hardy, U.S. Pat. No. 2,659,444 to Stanley, U.S. Pat. No. 3,470,604 to Zenick, U.S. Pat. No. 3,438,116 to Stengle, Jr., U.S. Pat. No. 2,679,913 to Scott, U.S. Pat. No. 2,058,618 to Patzig, U.S. Pat. No. 1,388,657 to McDonald et al and U.S. Pat. No. 3,480,373 to Talbot all disclose different types of blade design, propeller design and methods of securing articles of manufacture through the use of thermoplastic. None of the above patents disclose the unique features of the injection molded propeller and method of making this molded propeller for producing a positive lock propeller mounted on a drive shaft.

SUMMARY OF THE INVENTION

The injection molded propeller provides a propeller wherein the drive shaft can be attached to the hub of the propeller both by a chemical and thermal shrink fit and by deformation due to the rotational forces of the propeller thereby providing a unique positive locking hub on the drive shaft.

The injection molded propeller comes from a prepolished mold thereby eliminating the need to polish the propeller. The consistency of the air foil and propeller shape of the mold propeller eliminates the requirement of hand labor. Further, more consistency is possible in the twist angle from the hub to the tip of the blade due to the elimination of material warpage during fabrication of the propeller.

Also, the injection molded propeller presents a typical weight savings of 25 percent when plastic is substituted for propellers made using conventional methods and materials.

Although an injection molded propeller is discussed herein it should be appreciated that the propeller and the method of making the propeller can be used equally well in manufacturing different types of pulleys, flywheels and the like for securing a shaft to a hub with a positive locking system as discussed herein.

The injection molded propeller and method for making the propeller is adapted for mounting on a drive shaft with the shaft having a plurality of ribs axially disposed around the circumference of the shaft. The propeller includes a hub having a bore therethrough. A plurality of propeller blades are formed with the base of the blades integrally formed and attached to the outer circumference of the hub. Grooves are axially spaced around the inner circumference of the hub. The bore of the hub is adapted for receiving the shaft therein with the ribs of the shaft indexed and received in the grooves of the hub.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a rear view of a four-bladed injection molded propeller mounted on a drive shaft.

FIG. 2 is a side view of the propeller.

FIG. 3 is an enlarged rear view of the hub of the propeller.

FIG. 4 is a rear view of the drive shaft.

FIG. 5 is a sectional view of a portion of the hub disposed around a portion of the drive shaft.

DETAILED DESCRIPTION OF THE DRAWINGS

In FIG. 1 the injection molded propeller is shown and designated by general reference numeral 10. The propeller 10 as shown in the drawings includes four blades 12 disposed at 90 degrees from each other with the base 14 of the blades 12 integrally formed and attached to the outer circumference 16 of a hub 18. It should be noted while four blades 12 are shown it can be appreciated that various numbers of blades can be integrally formed in the hub 18.

The hub 18 includes a bore 20 for receiving a shaft 22 therethrough. The detailed structure of the shaft 22 can be seen more clearly in FIG. 4

In FIG. 2 a side view of the propeller 10 can be seen mounted on the shaft 22 with one end of the shaft 22 received inside the bore 20 of the hub 18.

In FIG. 3 an enlarged front view of the hub 18 of the propeller 10 can be seen. In this view an inner circumference 24 of the hub 18 can be seen with four grooves 26 axially spaced therearound and disposed at 90 degrees to each other. Also the grooves 26 are disposed at a 45 degree angle from a center line 13 of the blades 12 as shown in FIG. 1. The concept allows for equally spaced grooves at equal distances between the blades or distributed mass, that is for three bladed propeller the corresponding angles are 120 degrees and 60 degrees. The grooves 26 are adapted for receiving axially extending ribs 28 formed around an outer circumference 30 of the shaft 22 as shown in FIG. 4 When the shaft 22 is inserted inside the bore 20 of the hub 18 the ribs 28 are indexed for receipt inside the grooves 26.

It should be noted that the injection molded propeller 10 is formed using standard injection molding technique wherein a negative propeller design is used to produce a mold die for receiving standard thermoplastic molding materials such as Duponts Rynite 545 and marketed under this trademark. Also other types of thermoplastic material such as polyesters, polyethylenes and polypropylenes or the like may be used. This type of material is loaded with chopped fiberglass. The mixture is then received in a hopper and fed into a heated screw and barrel of a standard injection molding machine.

The molding material is injected into the molded die using the heated screw and barrel. The molding pressures are between 500 psi and 2,000 psi. After molding the hot propeller 10 it is removed from the mold die. As the thermoplastic material continues to shrink as it cools the drive shaft 22 is fitted into the hot propeller hub 18. As the propeller 10 continuous to cool it shrinks around the ribs 28 of the shaft 22 forming a high pressure bond of approximately 3,000 psi. This method of attaching the drive shaft to the hub 18 forms a positive locking hub 18. Also by offsetting the grooves 26 at a 45 degree angle from the center line 13 of the propeller blades 12 the elastic deformation shape of the hub 18 shown in dotted line 32 is at it greatest along the center line 13 and at its least in the mass of the hub 18 where the grooves 26 are formed therein. Because the deformation due to the rotational forces of the blades 12 is at its greatest along the center line 13 of the blades 12, this deformation causes compression of the hub 18 in the area of the grooves 26 and against the ribs 28 to compliment the shrink fit provided by the chemical and thermal shrinkage.

In FIG. 5 an enlarged view of portion of the hub 18 and the shaft 22 is shown wherein stress relief voids 34 are formed during the molding of the propeller 10 to prevent forces due to thermoplastic shrinking and rotational stress which causes cracking or structural weaknesses in the groove area 26 in the hub 18 during the inserting of the shaft 22 in the hub 18 or during the operation of the propeller 10.

Changes may be made in the construction and arrangement of the parts or elements of the embodiments as described herein without departing from the spirit or scope of the invention defined in the following claims.

What is claimed is:

1. An injection molded propeller adapted for mounting on a drive shaft, the shaft having a plurality of ribs disposed around the circumference of the shaft, the propeller comprising:

a hub having a bore therethrough;

a plurality of propeller blades, the base of the blades integrally formed and attached to the outer circumference of the hub; and a plurality of grooves spaced around the inner circumference of the hub and along the length thereof, each groove in the hub offset from the centerline of each propeller blade, the bore of the hub adapted for receiving the shaft therein, the ribs of the shaft indexed and received in and along the length of the grooves of the hub.

2. The propeller as described in claim 1 including four propeller blades, the blades disposed on the hub at 90 degrees to each other, the grooves spaced around the inner circumference of the hub are disposed at 45 degrees from the center line of the blades.

3. The propeller as described in claim 1 further including stress relief voids formed at the crown of the grooves and adjacent the sides of the ribs when the shaft is received in the hub.

4. An injection molded propeller adapted for mounting on a drive shaft, the shaft having a plurality of ribs disposed around the circumference of the shaft, the propeller comprising:

a hub having a bore therethrough;

four propeller blades, the base of the blades integrally formed and attached to the outer circumference of the hub, the blades disposed at 90 degrees from each other; and a plurality of grooves spaced around the inner circumference of the hub and along the length thereof and disposed at 45 degrees from the center line of the blades, the bore of the hub adapted for receiving the shaft therein, the ribs of the shaft indexed and received in and along the length of the grooves of the hub.

* * * * *